United States Patent
Yokoyama et al.

(10) Patent No.: US 11,156,473 B2
(45) Date of Patent: *Oct. 26, 2021

(54) INFORMATION PROCESSING APPARATUS, INFORMATION PROCESSING SYSTEM, AND INFORMATION PROCESSING METHOD

(71) Applicants: SONY CORPORATION, Tokyo (JP); SONY MOBILE COMMNUNICATIONS INC., Tokyo (JP)

(72) Inventors: Ryo Yokoyama, Tokyo (JP); Akira Ono, Kanagawa (JP); Tetsuya Naruse, Kanagawa (JP); Mikio Takenaka, Kanagawa (JP); Ryosuke Murakami, Tokyo (JP); Hideaki Hayashi, Aichi (JP); Mioko Ambe, Tokyo (JP); Ryosuke Takeuchi, Saitama (JP); Kazutoshi Ohno, Kanagawa (JP); Seiji Muramatsu, Saitama (JP); Tetsuya Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/324,469

(22) PCT Filed: Jun. 19, 2017

(86) PCT No.: PCT/JP2017/022476
§ 371 (c)(1),
(2) Date: Feb. 8, 2019

(87) PCT Pub. No.: WO2018/034053
PCT Pub. Date: Feb. 22, 2018

(65) Prior Publication Data
US 2019/0178674 A1    Jun. 13, 2019

(30) Foreign Application Priority Data
Aug. 18, 2016   (JP) .............................. JP2016-160681

(51) Int. Cl.
*G01C 21/36* (2006.01)
*G09B 29/10* (2006.01)
(Continued)

(52) U.S. Cl.
CPC ......... *G01C 21/3652* (2013.01); *G01C 21/26* (2013.01); *G01C 21/30* (2013.01);
(Continued)

(58) Field of Classification Search
CPC ................ G01C 21/3652; G01C 21/26; G01C 21/3623; G01C 21/30; G01C 21/3632;
(Continued)

(56) References Cited

U.S. PATENT DOCUMENTS

| 6,858,003 | B2 * | 2/2005 | Evans | A61B 34/32 600/103 |
| 7,106,313 | B2 * | 9/2006 | Schena | G05G 9/047 345/157 |

(Continued)

FOREIGN PATENT DOCUMENTS

| CN | 105005970 A | * | 10/2015 | |
| CN | 105027190 A | * | 11/2015 | ............. G06F 3/017 |

(Continued)

OTHER PUBLICATIONS

International Search Report and Written Opinion issued in connection with International Patent Application No. PCT/JP2017/022476, dated Aug. 22, 2017. (9 pages).

(Continued)

*Primary Examiner* — Behrang Badii
*Assistant Examiner* — Jalal C Coduroglu
(74) *Attorney, Agent, or Firm* — K&L Gates LLP

(57) ABSTRACT

[Object] An object of the present technology is to provide an information processing apparatus, an information processing system, and an information processing method capable of allowing a user to approach a destination intuitively.

(Continued)

[Solving Means] An information processing apparatus according to the present technology includes a position-coordinate acquisition part, a direction acquisition part, a direction calculation part, and a haptic-feedback determining part. The position-coordinate acquisition part acquires a position coordinate of the information processing apparatus. The direction acquisition part acquires an apparatus direction that the information processing apparatus faces. The direction calculation part calculates a target direction being a direction of a target with respect to the information processing apparatus from a position coordinate of the target and the position coordinate of the information processing apparatus. The haptic-feedback determining part determines a haptic feedback to be presented to a user on the basis of an angle formed by the apparatus direction and the target direction.

10 Claims, 10 Drawing Sheets

(51) Int. Cl.
    *G01C 21/26*     (2006.01)
    *G06F 3/01*     (2006.01)
    *G08G 1/005*     (2006.01)
    *G01C 21/30*     (2006.01)

(52) U.S. Cl.
    CPC .......... *G01C 21/3623* (2013.01); *G06F 3/01* (2013.01); *G08G 1/005* (2013.01); *G09B 29/10* (2013.01)

(58) Field of Classification Search
    CPC ........... G08G 1/005; G06F 3/01; G06F 3/016; G09B 29/10
    See application file for complete search history.

(56) References Cited

U.S. PATENT DOCUMENTS

| | | | | |
|---|---|---|---|---|
| 7,716,008 B2* | 5/2010 | Ohta | ....................... | A63F 13/10 702/152 |
| 7,774,155 B2* | 8/2010 | Sato | ....................... | A63F 13/06 702/127 |
| 8,041,536 B2* | 10/2011 | Ohta | ....................... | A63F 13/10 702/152 |
| 8,090,537 B2* | 1/2012 | Nishira | ................... | G05D 1/027 701/301 |
| 8,157,651 B2* | 4/2012 | Ohta | ..................... | A63F 13/426 463/37 |
| 8,386,160 B2* | 2/2013 | Tsunekawa | ............ | G08G 1/165 701/301 |
| 8,576,222 B2* | 11/2013 | Handley | ............. | G06F 3/03545 345/419 |
| 8,594,376 B2* | 11/2013 | Ogasawara | ............ | A63F 13/213 382/103 |
| 8,649,603 B2* | 2/2014 | Ogasawara | ............... | G06T 7/74 382/181 |
| 8,708,824 B2* | 4/2014 | Ohta | ..................... | A63F 13/213 463/37 |
| 8,781,197 B2* | 7/2014 | Wang | ................... | G01R 33/563 382/131 |
| 8,977,297 B2* | 3/2015 | Ooka | ................... | G06F 3/0346 455/456.3 |
| 9,104,271 B1* | 8/2015 | Adams | .................... | G06F 3/014 |
| 9,179,262 B2* | 11/2015 | Ooka | ................... | G08G 1/005 |
| 9,498,709 B2* | 11/2016 | Ikeda | ....................... | A63F 13/10 |
| 9,508,258 B2* | 11/2016 | Arai | .................. | G01C 21/3655 |
| 9,569,057 B2* | 2/2017 | Ooka | .................... | G06F 3/048 |
| 9,753,542 B2* | 9/2017 | Chizeck | ................. | A61B 34/25 |
| 9,799,141 B2* | 10/2017 | Ueno | .................... | A63F 9/0612 |
| 9,952,755 B2* | 4/2018 | Ogiso | ................ | G06F 3/04845 |
| 2006/0167784 A1* | 7/2006 | Hoffberg | .............. | G06Q 20/401 705/37 |
| 2007/0087756 A1* | 4/2007 | Hoffberg | .............. | G06Q 20/065 455/450 |
| 2007/0139375 A1* | 6/2007 | Rosenberg | .............. | A63F 13/06 345/161 |
| 2008/0140314 A1* | 6/2008 | Park | ....................... | G01C 21/00 701/469 |
| 2008/0150891 A1* | 6/2008 | Berkley | ................. | G06F 3/016 345/156 |
| 2008/0266066 A1* | 10/2008 | Braun | ................... | G06F 3/0338 340/407.2 |
| 2010/0169015 A1* | 7/2010 | Tsunekawa | ............ | G08G 1/166 701/300 |
| 2010/0279738 A1* | 11/2010 | Kim | ...................... | G06F 3/0428 455/566 |
| 2010/0317420 A1* | 12/2010 | Hoffberg | ............... | G07F 17/323 463/1 |
| 2011/0190058 A1* | 8/2011 | Houston | ............... | A63F 13/285 463/36 |
| 2012/0150431 A1* | 6/2012 | Ooka | ................. | G01C 21/3652 701/425 |
| 2012/0176525 A1 | 7/2012 | Garin et al. | | |
| 2012/0287068 A1* | 11/2012 | Colgate | .................... | G06F 3/046 345/173 |
| 2013/0172905 A1* | 7/2013 | Iorgulescu | ............. | A61B 34/20 606/130 |
| 2014/0107471 A1* | 4/2014 | Haider | ............... | A61B 17/1703 600/424 |
| 2014/0132388 A1* | 5/2014 | Alalawi | ............... | G09B 21/003 340/4.12 |
| 2014/0177794 A1* | 6/2014 | De Man | ............... | A61B 6/4021 378/62 |
| 2014/0192247 A1* | 7/2014 | Cheong | ................... | G06F 3/016 348/333.11 |
| 2015/0268724 A1* | 9/2015 | Levesque | ............... | G06F 3/0488 345/156 |
| 2016/0022374 A1* | 1/2016 | Haider | ................. | A61B 17/142 606/96 |
| 2016/0162031 A1* | 6/2016 | Westerman | ......... | G06F 3/04812 345/173 |
| 2016/0187988 A1* | 6/2016 | Levesque | .............. | F16M 13/04 345/156 |
| 2016/0231746 A1* | 8/2016 | Hazelton | ............... | G01S 13/867 |
| 2017/0147866 A1* | 5/2017 | Tokui | ...................... | G06T 11/00 |
| 2017/0168630 A1* | 6/2017 | Khoshkava | .............. | G06F 3/017 |
| 2017/0256144 A1* | 9/2017 | Khoshkava | .............. | G06F 3/016 |
| 2017/0269689 A1* | 9/2017 | Levesque | ................ | G06F 1/163 |
| 2017/0293297 A1* | 10/2017 | Kim | ....................... | B64D 47/08 |
| 2018/0304467 A1* | 10/2018 | Matsuura | ................. | B25J 13/06 |
| 2019/0178674 A1* | 6/2019 | Yokoyama | ............. | G01C 21/30 |
| 2019/0291002 A1* | 9/2019 | Yokoyama | ............ | A63F 13/219 |

FOREIGN PATENT DOCUMENTS

| | | | | |
|---|---|---|---|---|
| CN | 110124305 A | * | 8/2019 | |
| CN | 110755845 A | * | 2/2020 | |
| EP | 2 610 835 | | 7/2013 | |
| EP | 2610835 A1 | * | 7/2013 | .............. H04W 4/21 |
| EP | 2613225 A2 | * | 7/2013 | ........... G06F 3/0484 |
| EP | 2610835 B1 | * | 10/2018 | ............ H04W 68/00 |
| EP | 3502841 A1 | * | 6/2019 | ............ G09B 29/10 |
| EP | 3502841 A4 | * | 4/2020 | ......... G01C 21/3623 |
| JP | 2000122520 A | * | 4/2000 | |
| JP | 2004-170359 | | 6/2004 | |
| JP | 2004-170359 A | | 6/2004 | |
| JP | 2008-145418 | | 6/2008 | |
| JP | 2008-145418 A | | 6/2008 | |
| JP | 2008-268144 | | 11/2008 | |
| JP | 2008-268144 A | | 11/2008 | |
| JP | 2008-286547 | | 11/2008 | |
| JP | 2008-286547 A | | 11/2008 | |
| JP | 2010142339 A | * | 7/2010 | |
| JP | 4795091 B2 | * | 10/2011 | .............. G06T 1/00 |
| JP | 2011257865 A | * | 12/2011 | |
| JP | 2012-117955 | | 6/2012 | |

(56) References Cited

FOREIGN PATENT DOCUMENTS

| JP | 2012-117955 | A |   | 6/2012  |              |
|----|-------------|---|---|---------|--------------|
| JP | 2012-127940 |   |   | 7/2012  |              |
| JP | 2012-127940 | A |   | 7/2012  |              |
| JP | 2013-033425 |   |   | 2/2013  |              |
| JP | 2013-033425 | A |   | 2/2013  |              |
| JP | 2013-061484 |   |   | 4/2013  |              |
| JP | 2014-020871 |   |   | 2/2014  |              |
| JP | 2014-020871 | A |   | 2/2014  |              |
| JP | 2014035603  | A | * | 2/2014  | ............ G06F 3/017 |
| JP | 2011-183374 |   |   | 8/2017  |              |
| JP | 2011-183374 | A |   | 8/2017  |              |
| JP | 2020008423  | A | * | 1/2020  |              |
| KR | 20100032542 | A |   | 3/2010  | ......... H05K 13/0813 |
| KR | 101009161   | B1| * | 1/2011  | ............ A63F 13/10 |
| KR | 20160078262 | A | * | 7/2016  | ............ F16M 11/06 |
| WO | 2011/099554 | A1|   | 8/2011  |              |
| WO | 2013/018558 | A1|   | 2/2013  |              |
| WO | WO-2017126072 | A1 | * | 7/2017 | ......... H04N 5/23206 |
| WO | WO-2018034053 | A1 | * | 2/2018 | ......... G01C 21/3652 |
| WO | WO-2018198909 | A1 | * | 11/2018 | ............ G06F 3/012 |

OTHER PUBLICATIONS

European Search Report dated Mar. 11, 2020 in corresponding European Application No. 17841281.3.

\* cited by examiner

INFORMATION PROCESSING APPARATUS, INFORMATION PROCESSING SYSTEM, AND INFORMATION PROCESSING METHOD

CROSS-REFERENCE TO RELATED APPLICATIONS

The present application claims the benefit of International Application No. PCT/JP2017/022476, filed Jun. 19, 2017, which claims priority to Japanese Application No. 2016-160681, filed Aug. 18, 2016, the disclosures of which are incorporated herein by reference.

BACKGROUND

The present technology relates to a technology of an information processing apparatus, an information processing system, and an information processing method capable of being used for guiding a user to a target position in real space.

With diffusion of a portable information terminal such as a smartphone, a method of setting a particular spot as a destination on a map displayed on an information terminal beforehand, and approaching the destination by checking position information and the destination acquired by the information terminal with the ones in real time becomes general (See Patent Literature 1, for example).

SUMMARY

Technical Problem

However, in the method described above, it is necessary for a user to understand how to see the map sufficiently, and set the destination on the map accurately. Moreover, it is possible that the user mistakes a direction in real space for the direction on the map while approaching the destination. Furthermore, the position information that is acquirable by the GPS (Global Positioning System) or the like may often include an error, and it is also difficult for the user to grasp the position information around the destination on the map in detail.

In view of the above-mentioned circumstances, it is an object of the present technology to provide an information processing apparatus, an information processing system, and an information processing method capable of allowing a user to approach a destination intuitively.

Solution to Problem

In order to attain the above-mentioned object, an information processing apparatus according to an embodiment of the present technology includes a position-coordinate acquisition part, a direction acquisition part, a direction calculation part, and a haptic-feedback determining part.

The position-coordinate acquisition part acquires a position coordinate of the information processing apparatus.

The direction acquisition part acquires an apparatus direction that the information processing apparatus faces.

The direction calculation part calculates a target direction being a direction of a target with respect to the information processing apparatus from a position coordinate of the target and the position coordinate of the information processing apparatus.

The haptic-feedback determining part determines a haptic feedback to be presented to a user on the basis of an angle formed by the apparatus direction and the target direction.

According to the structure, the haptic feedback determined on the basis of the angle formed by the apparatus direction and the target direction is presented to the user. As a result, when the user turns the information processing apparatus to various directions, the user may grasp whether the apparatus direction coincides with the target direction or not by the haptic feedback without seeing a display, and may detect the target direction intuitively.

The haptic-feedback determining part determines a first haptic feedback as the haptic feedback to be presented to the user in a case that the formed angle is a predetermined value or more, and determines a second haptic feedback being different from the first haptic feedback as the haptic feedback to be presented to the user in a case that the formed angle is less than the predetermined value.

According to the structure, in the case that the apparatus direction does not coincide with the target direction, and the angle formed by the apparatus direction and the target direction is the predetermined value or more, the first haptic feedback is presented the user. On the other hand, in the case that the apparatus direction coincides with the target direction, and the formed angle is less than the predetermined value, the second haptic feedback is presented to the user.

The haptic-feedback determining part determines an intensity of the first haptic feedback according to a size of the formed angle in the case that the formed angle is the predetermined value or more.

According to the structure, the user may detect the target direction by using the intensity of the first haptic feedback, and as a result, the user may easily find the target direction.

The haptic-feedback determining part may determine an intensity of the second haptic feedback according to a distance between the information processing apparatus and the target in the case that the formed angle is less than the predetermined value.

According to the structure, the user may estimate the distance between the information processing apparatus and the target position by using the intensity of the second haptic feedback.

The information processing apparatus may further include a haptic-feedback presenting part presenting the haptic feedback to the user, and the haptic-feedback presenting part may produce an oscillation that causes the user to feel that the information processing apparatus is pulled in a predetermined direction.

According to the structure, the user may easily find the target position by using a feeling (haptic feedback) that the information processing apparatus is pulled in the predetermined direction. For example, the haptic-feedback presenting part may not present the haptic feedback in the case that the angle formed by the apparatus direction and the target direction is the predetermined value or more, and the haptic-feedback presenting part may present the haptic feedback that the information processing apparatus moves in the target direction in the case that the formed angle is less than the predetermined value.

The information processing apparatus may further include a target-position setting part setting the position coordinate of the information processing apparatus as the position coordinate of the target according to a predetermined operation input to the information processing apparatus.

According to the structure, the position coordinate of the information processing apparatus may be set as the position coordinate of the target. For example, after the present position of the information processing apparatus is set as the position of the target, the user may move from the present position, and may search for the target position again.

In order to attain the above-mentioned object, an information processing system according to an embodiment of the present technology includes a position-coordinate acquisition part, a direction acquisition part, a direction calculation part, and a haptic-feedback determining part.

The position-coordinate acquisition part acquires a position coordinate of an information processing apparatus.

The direction acquisition part acquires an apparatus direction that the information processing apparatus faces.

The direction calculation part calculates a target direction being a direction of a target with respect to the information processing apparatus from a position coordinate of the target and the position coordinate of the information processing apparatus.

The haptic-feedback determining part determines a haptic feedback to be presented to a user on the basis of an angle formed by the apparatus direction and the target direction.

In order to attain the above-mentioned object, in an information processing method according to an embodiment of the present technology, a position-coordinate acquisition part acquires a position coordinate of an information processing apparatus.

A direction acquisition part acquires an apparatus direction that the information processing apparatus faces.

A direction calculation part calculates a target direction being a direction of a target with respect to the information processing apparatus from a position coordinate of the target and the position coordinate of the information processing apparatus.

A haptic-feedback determining part determines a haptic feedback to be presented to a user on the basis of an angle formed by the apparatus direction and the target direction.

Advantageous Effects of Invention

As described above, according to the present technology, an information processing apparatus, an information processing system, and an information processing method capable of allowing a user to approach a destination intuitively may be provided. Note that the effects described above are not limitative, but any effect described in the present disclosure may be produced.

DETAILED DESCRIPTION

[Structure of Information Processing Apparatus]

Figure 1:
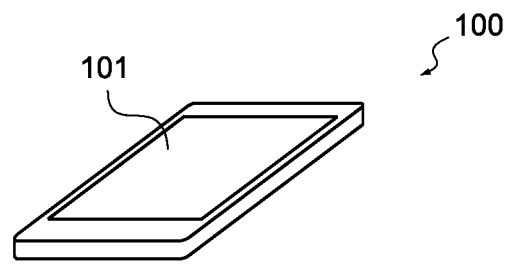
FIG. 1 A perspective view showing an information processing apparatus according to a first embodiment of the present technology.

FIG. 1 is a perspective view showing an information processing apparatus 100 according to the present embodiment. The information processing apparatus 100 may be a portable information processing apparatus such as a smartphone, a tablet PC, or a head mount display, in other words, an information processing apparatus capable of realizing a functional configuration described below. Hereinafter, the information processing apparatus 100 will be assumed to be a smartphone and be described.

As shown in FIG. 1, the information processing apparatus 100 includes a display 101. Furthermore, the information processing apparatus 100 may include a button and the like that are not shown.

Figure 2:
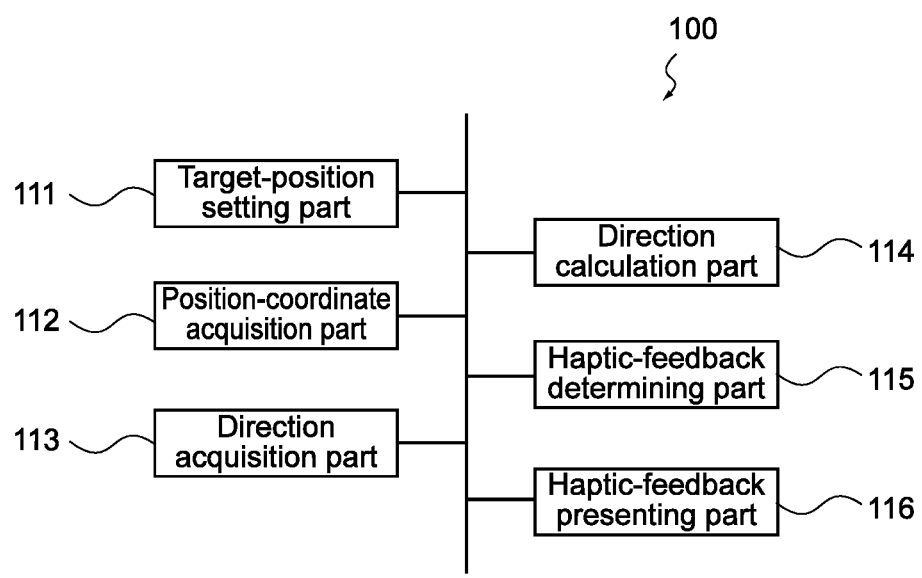
FIG. 2 A block diagram showing a functional configuration of the information processing apparatus.

FIG. 2 is a block diagram showing the functional configuration of the information processing apparatus 100. As shown in FIG. 2, the information processing apparatus 100 includes a target-position setting part 111, a position-coordinate acquisition part 112, a direction acquisition part 113, a direction calculation part 114, a haptic-feedback determining part 115, and a haptic-feedback presenting part 116 as the functional configuration.

Figure 3:
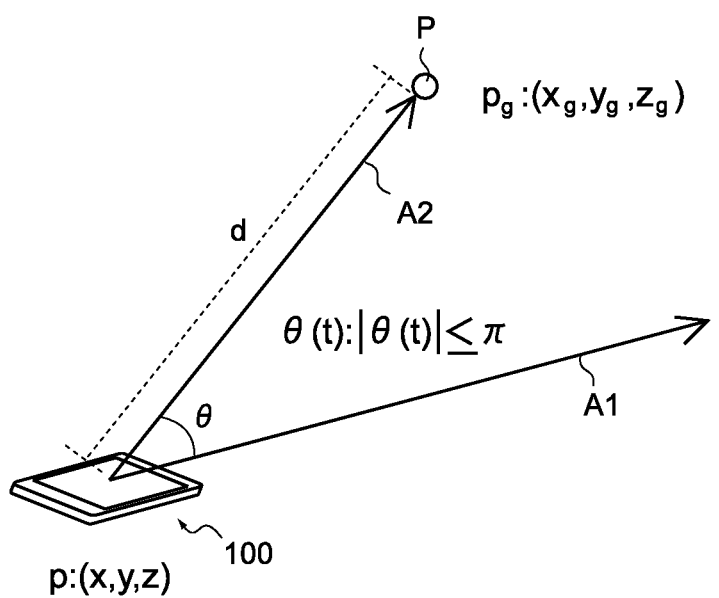
FIG. 3 A diagram schematically showing the functional configuration of the information processing apparatus.

FIG. 3 is a diagram schematically illustrating the functional configuration of the information processing apparatus 100. In FIG. 3, a target P (position $p_g$: $(x_g, y_g, z_g)$) is shown.

The target-position setting part 111 sets a position coordinate of the target P. The target P is a target appointed by a user in real space. Typically, when the user appoints an arbitrary position in a map application displayed on the display 101, a position coordinate in real space corresponding to the position appointed on the map is acquired by the map application.

The target-position setting part 111 acquires the position coordinate by such a map application, and sets the position coordinate as the position coordinate of the target P. Furthermore, the target-position setting part 111 may set the position coordinate of the target P by using an arbitrary method. The position coordinate of the target P may be a two-dimensional coordinate (for example, longitude and latitude), and may also be a three-dimensional coordinate (for example, longitude, latitude, and height). The target-position setting part 111 supplies the position coordinate of the set target P to the direction calculation part 114.

The position-coordinate acquisition part 112 acquires a position coordinate (position p: (x, y, z)) of the information processing apparatus 100. Specifically, the position-coordinate acquisition part 112 may acquire the position coordinate of the information processing apparatus 100 by using the GPS (Global Positioning System). Moreover, the position-coordinate acquisition part 112 may also acquire the position coordinate of the information processing apparatus 100 by using Wi-Fi or the like. The position-coordinate acquisition part 112 supplies the acquired position coordinate of the information processing apparatus 100 to the direction calculation part 114.

The direction acquisition part 113 acquires a direction (hereinafter, apparatus direction) that the information processing apparatus 100 faces. Typically, the direction that the information processing apparatus 100 faces is a direction along an extended line of the display 101 in its longitudinal direction. However, this is not particularly limited, and may be a particular direction in which the information processing apparatus 100 is a center. The direction acquisition part 113 may acquire the apparatus direction by using an output from each of a geomagnetic sensor or an acceleration sensor. In FIG. 3, an apparatus direction A1 is shown as the direction that the information processing apparatus 100 faces. The direction acquisition part 113 supplies the apparatus direction A1 to the haptic-feedback determining part 115.

The direction calculation part 114 calculates a target direction. The target direction is a direction of the target P with respect to the information processing apparatus 100. The direction calculation part 114 may calculate the target direction from the position coordinate of the target P supplied from the target-position setting part 111 and the position coordinate of the information processing apparatus 100 supplied from the position-coordinate acquisition part 112. In FIG. 3, a target direction A2 is shown. The direction calculation part 114 supplies the target direction A2 to the haptic-feedback determining part 115.

The haptic-feedback determining part 115 determines a haptic feedback that the haptic-feedback presenting part 116 presents to the user. Specifically, the haptic-feedback determining part 115 determines the haptic feedback to be presented to the user on the basis of an angle formed by the apparatus direction A1 and the target direction A2.

Figure 4:
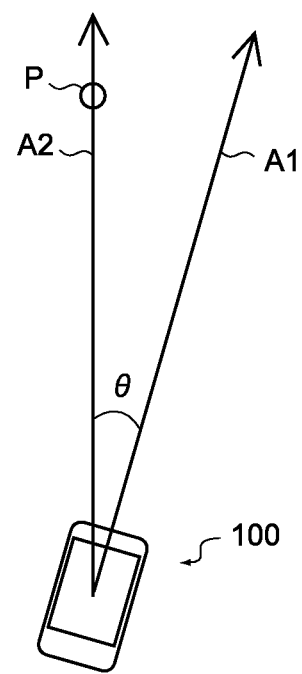
FIG. 4 A diagram schematically showing an operation mode of the information processing apparatus.
Figure 5:
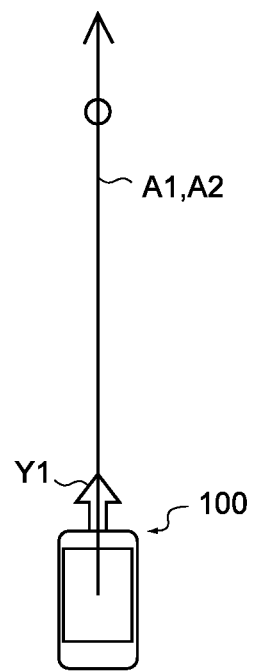
FIG. 5 A diagram schematically showing an operation mode of the information processing apparatus.

FIGS. 4 and 5 are diagrams schematically showing the angle θ (θ(t): |θ(t)|≤π) formed by the apparatus direction A1 and the target direction A2. As shown in FIG. 4, the haptic-feedback determining part 115 determines a first haptic feedback as the haptic feedback to be presented to the user in a case that the apparatus direction A1 and the target direction A2 do not coincide with each other, and the angle θ is a predetermined value or more.

Moreover, as shown in FIG. 5, the haptic-feedback determining part 115 determines a second haptic feedback as the haptic feedback to be presented to the user in a case that the apparatus direction A1 and the target direction A2 coincide with each other, and the angle θ is less than the predetermined value. The predetermined value is not particularly limited, and for example, 5 degrees. The haptic-feedback determining part 115 supplies the determined haptic feedback to the haptic-feedback presenting part 116.

The haptic-feedback presenting part 116 presents the haptic feedback determined by the haptic-feedback determining part 115 to the user. The haptic-feedback presenting part 116 produces a particular oscillation to the information processing apparatus 100, and may be a haptic-feedback presenting device (See WO/2015/151380) capable of causing the user holding the information processing apparatus 100 to feel (haptic feedback) that the information processing apparatus 100 is pulled in a particular direction.

For example, the haptic-feedback presenting part 116 may produce an oscillation being continuous and little by little as the first haptic feedback, and may produce an oscillation having a larger amplitude than an amplitude of the first haptic feedback as the second haptic feedback. Moreover, as shown by an arrow Y1 in FIG. 5, the haptic-feedback presenting part 116 may produce a haptic feedback that the information processing apparatus 100 is pulled in the apparatus direction A1 as the second haptic feedback.

Examples of the first haptic feedback include oscillations expressed by [Math. 1] and [Math. 2] described below.

$$\text{Intensity} = \frac{\pi - |\theta(t)|}{\pi} \qquad \text{[Math. 1]}$$

$$\text{Intensity} = \begin{cases} 1 & \text{if } |\theta(t)| < |\theta(t-1)| \\ 0 & \text{otherwise} \end{cases} \qquad \text{[Math. 2]}$$

Examples of the second haptic feedback include oscillations expressed by [Math. 3] and [Math. 4] described below.

$$\text{Intensity} = \begin{cases} 1 & \text{if } \varepsilon \leq |\theta(t-1)| \text{ AND } |\theta(t)| < \varepsilon \\ 0 & \text{otherwise} \end{cases} \qquad \text{[Math. 3]}$$

$$\text{Intensity} = \begin{cases} 1 & \text{if } |\theta(t)| < \varepsilon \text{ AND } d < T1_d \\ \dfrac{T2_d - d}{T2_d} & \text{if } |\theta(t)| < \varepsilon \text{ AND } T1_d < d < T2_d \\ 0 & \text{otherwise} \end{cases} \qquad \text{[Math. 4]}$$

Furthermore, the haptic-feedback presenting part 116 may produce any haptic feedback as long as the user may recognize a difference between the first haptic feedback and the second haptic feedback. Moreover, a haptic-feedback presenting mechanism is not limited to the haptic-feedback presenting device, and may be an eccentric motor. In this case, the haptic-feedback presenting part 116 may present the first haptic feedback and the second haptic feedback to the user by changing at least one of an oscillation duration, a frequency, or an amplitude of the eccentric motor.

[Operation of Information Processing Apparatus]

Figure 6:
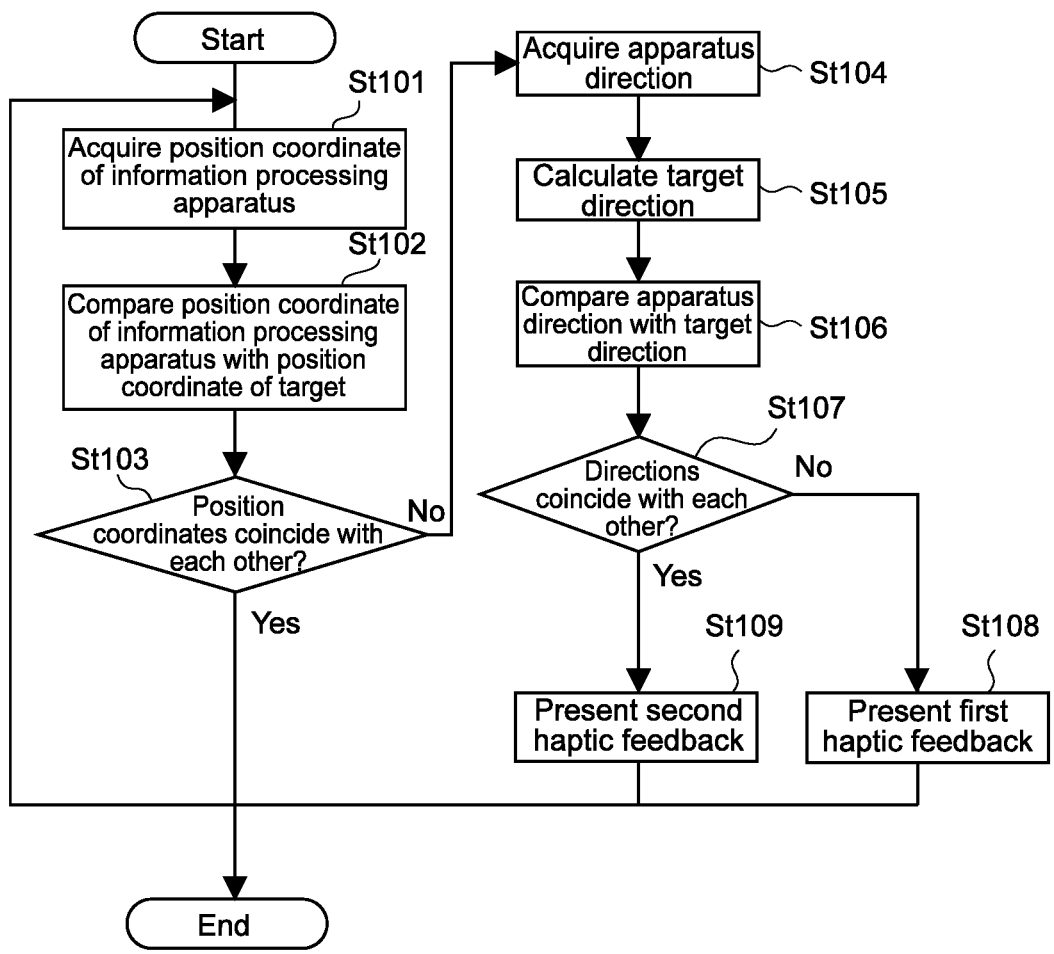
FIG. 6 A flowchart showing an operation of the information processing apparatus.

An operation of the information processing apparatus 100 will be described. FIG. 6 is a flowchart showing the operation of the information processing apparatus 100. Note that the position coordinate of the target P is preset by the target-position setting part 111.

First, the position-coordinate acquisition part 112 acquires the position coordinate of the information processing apparatus 100 (St101), and the haptic-feedback determining part 115 compares the position coordinate of the information processing apparatus 100 with the position coordinate of the target P (St102).

In a case that the position coordinate of the information processing apparatus 100 and the position coordinate of the target P coincide with each other (St103: Yes), the information processing apparatus 100 ends the operation. In a case that the position coordinate of the information processing apparatus 100 and the position coordinate of the target P do not coincide with each other (St103: No), the direction acquisition part 113 acquires the apparatus direction A1 (St104).

Next, the direction calculation part 114 calculates the target direction A2 (St105), and the haptic-feedback determining part 115 compares the apparatus direction A1 with the target direction A2 (St106).

In the case that the apparatus direction A1 and the target direction A2 do not coincide with each other (St107: No), the haptic-feedback determining part 115 determines the first haptic feedback as the haptic feedback to be presented to the user, and the haptic-feedback presenting part 116 presents the first haptic feedback to the user (St108). In the case that the apparatus direction A1 and the target direction A2 coincide with each other (St107: Yes), the haptic-feedback determining part 115 determines the second haptic feedback as the haptic feedback to be presented to the user, and the haptic-feedback presenting part 116 presents the second haptic feedback to the user (St109).

The information processing apparatus 100 executes the operation until the position coordinate of the information processing apparatus 100 and the position coordinate of the target P coincide with each other (St103: Yes).

Seen by the user, when the user turns the information processing apparatus 100 to a predetermined direction after appointing the target P, the first haptic feedback is presented from the information processing apparatus 100 in the case that the apparatus direction A1 and the target direction A2 do not coincide with each other. Then, the user may recognize that the apparatus direction A1 and the target direction A2 do not coincide with each other.

When the user changes the direction that the information processing apparatus 100 faces, and the apparatus direction A1 and the target direction A2 coincide with each other, the second haptic feedback is presented from the information processing apparatus 100. Then, the user may recognize that the apparatus direction A1 and the target direction A2 coincide with each other.

Due to this, the user may grasp the direction in which the target exists intuitively without seeing the display 101 on the information processing apparatus 100.

[Change of Intensity of First Haptic Feedback]

As described above, in the case that the apparatus direction A1 and the target direction A2 do not coincide with each other, the haptic-feedback determining part 115 presents the first haptic feedback to the user. However, as the angle θ formed by the apparatus direction A1 and the target direction A2 is smaller, an intensity of the first haptic feedback may be increased. The haptic-feedback presenting part 116 may increase the intensity of the first haptic feedback by changing a frequency or the amplitude of the oscillation producing the first haptic feedback.

Due to this, the user may grasp that the apparatus direction A1 approaches the target direction A2 by the intensity of the first haptic feedback, and as a result, the user may easily make the apparatus direction A1 coincide with the target direction A2.

[Guidance to Target Direction by First Haptic Feedback]

Figure 7:
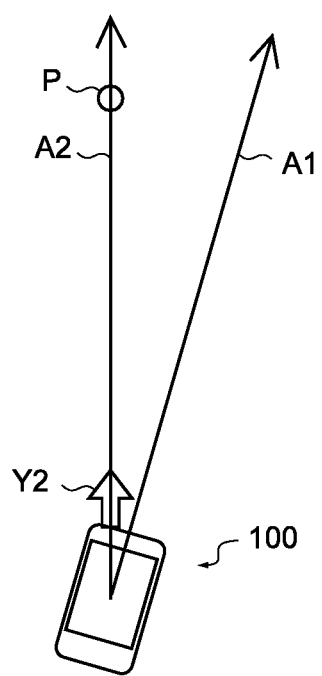
FIG. 7 A diagram schematically showing an operation mode of the information processing apparatus.

FIG. 7 is a diagram schematically showing a method of guidance to the target direction A2 by the first haptic feedback. As shown by an arrow Y2 in FIG. 7, the haptic-feedback presenting part 116 may present a haptic feedback that the information processing apparatus 100 is pulled in the target direction A2 as the first haptic feedback to the user in the case that the apparatus direction A1 and the target direction A2 do not coincide with each other.

Due to this, the user may grasp the target direction A2 through the first haptic feedback, and as a result, the user may easily make the apparatus direction A1 coincide with the target direction A2.

[Change of Intensity of Haptic Feedback by Distance]

The haptic-feedback determining part 115 may change the intensity of the first haptic feedback and an intensity of the second haptic feedback according to the distance between the information processing apparatus 100 and the target P. The haptic-feedback determining part 115 may calculate a distance d (See FIG. 3) between the information processing apparatus 100 and the target P from the position coordinate of the information processing apparatus 100 and the position coordinate of the target P.

Specifically, the haptic-feedback presenting part 116 may increase the intensity of the first haptic feedback as the distance d is smaller, in the case that the apparatus direction A1 and the target direction A2 do not coincide with each other. On the other hand, the haptic-feedback presenting part 116 may increase the intensity of the second haptic feedback as the distance d is smaller, in the case that the apparatus direction A1 and the target direction A2 coincide with each other. Moreover, the haptic-feedback presenting part 116 may increase only one of the intensity of the first haptic feedback or the intensity of the second haptic feedback as the distance d is smaller.

Due to this, besides the direction of the target P, the user may also grasp the distance between the information processing apparatus 100 and the target P.

[Method of Appointing Position]

As described above, the target-position setting part 111 sets the position appointed by the user as the position of the target P. However, appointment of the position by the user is not limited to appointment by using the map application. For example, when the user taps the display 101 on which a touch sensor is provided, the target-position setting part 111 may acquire the position coordinate of the information processing apparatus 100 from the position-coordinate acquisition part 112, and may set the acquired position coordinate as the position coordinate of the target P.

Furthermore, the target-position setting part 111 may set the position coordinate of the information processing apparatus 100 as the position coordinate of the target P according to a particular operation input by the user such as pressing a particular button provided on the information processing apparatus 100 or shaking the information processing apparatus 100. Due to this, the user may more easily set the position coordinate of the target P than by using the map application.

At this time, position information of the information processing apparatus 100, user information related to the information processing apparatus 100 itself, the point of time, weather information or the like may be saved in the information processing apparatus 100, a server, or the like.

[Hardware Configuration]

Figure 8:
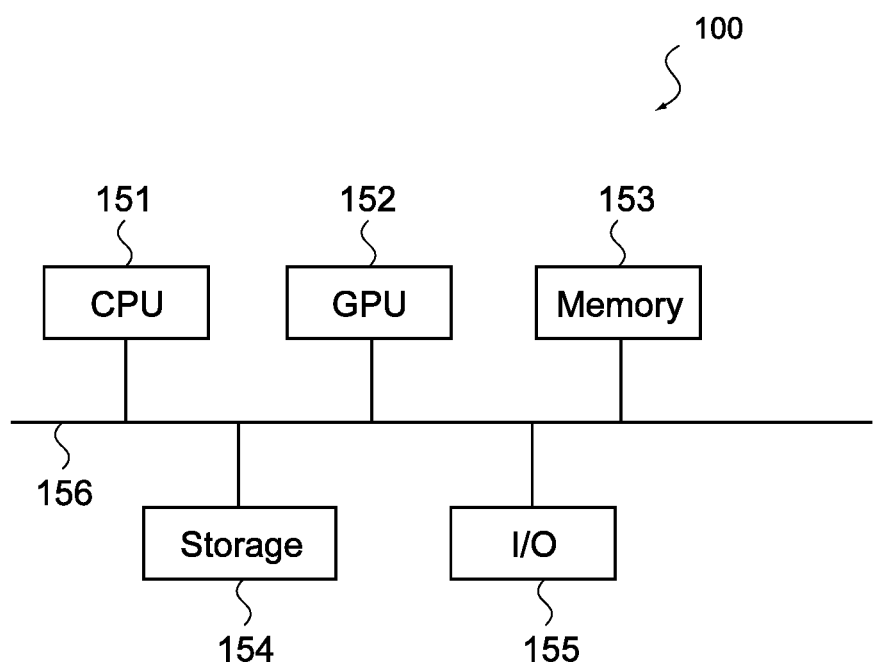
FIG. 8 A block diagram showing a hardware configuration of the information processing apparatus.

FIG. 8 is a diagram schematically showing a hardware configuration of the information processing apparatus 100. As shown in FIG. 8, the information processing apparatus 100 includes a CPU 151, a GPU 152, a memory 153, a storage 154, and an input/output part (I/O) 155 as the hardware configuration. These are connected to each other by a bus 156.

The CPU (Central Processing Unit) 151 controls the other configuration according to a program stored in the memory 153, performs data processing according to the program, and stores a processing result in the memory 153. The CPU 151 may be a microprocessor.

The GPU (Graphic Processing Unit) 152 is controlled by the CPU 151, and executes image processing. The CPU 151 is capable of causing the GPU 152 to execute parallel arithmetic processing and perform a characteristic amount of extraction at high speed. The GPU 152 may be a microprocessor.

The memory 153 stores a program and data executed by the CPU 151. The memory 153 may be an RAM (Random Access Memory).

The storage 154 stores a program and data. The storage 154 may be an HDD (hard disk drive) or an SSD (solid state drive).

The input/output part 155 receives an input to the information processing apparatus 100, and supplies an output from the information processing apparatus 100 externally. The input/output part 155 includes an input apparatus such as a keyboard or a mouse, an output apparatus such as a display, and a connection interface such as a network.

Moreover, hardware such as a GPS module, a geomagnetic sensor, and an acceleration sensor that realizes the functional configuration of the information processing apparatus 100 described above and is not shown is connected to the input/output part 155.

The hardware configuration of the information processing apparatus 100 is not limited to the configuration described above, and may be a configuration in which a functional configuration of an information processing apparatus 1100 may be realized. Moreover, a part or all of the hardware configuration may exist in the network.

[Information Processing System]

The functional configuration of the information processing apparatus 100 described above may be realized by an information processing system including a plurality of information processing apparatuses that are connected to each other. For example, the functional configuration of the information processing apparatus 100 described above may be realized by the information processing system including an information processing apparatus that includes the position-coordinate acquisition part 112, the direction acquisition part 113, and the direction calculation part 114, and an information processing apparatus that includes the haptic-feedback presenting part 116.

Second Embodiment

Figure 9:
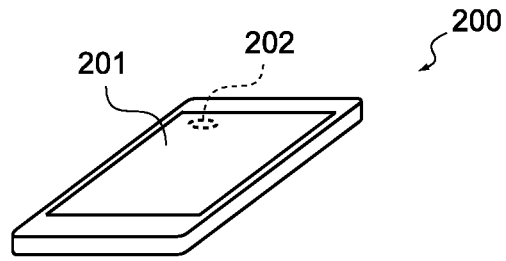
FIG. 9 A perspective view showing an information processing apparatus according to a second embodiment of the present technology.

FIG. 9 is a perspective view showing an information processing apparatus 200 according to the present embodiment. The information processing apparatus 200 may be a portable information processing apparatus such as a smartphone, a tablet PC, or a head mount display, in other words, an information processing apparatus capable of realizing a functional configuration described below. Hereinafter, the information processing apparatus 200 will be assumed to be a smartphone and be described.

As shown in FIG. 9, the information processing apparatus 200 includes a display 201 and a camera 202. The camera 202 is provided on an opposite side to the display 201. Furthermore, the information processing apparatus 200 may include a button and the like that are not shown.

Figure 10:
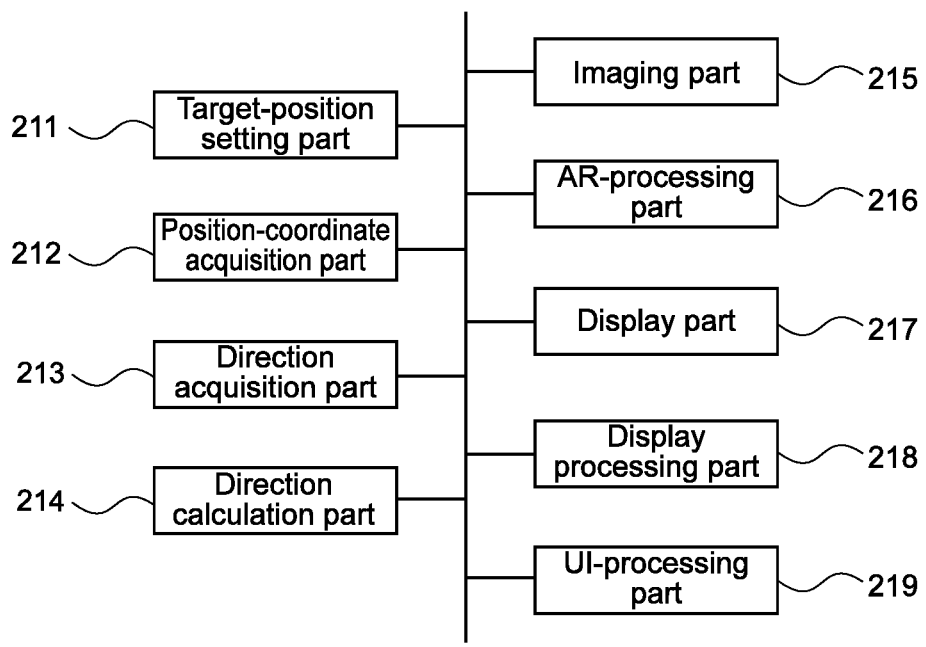
FIG. 10 A block diagram showing a functional configuration of the information processing apparatus.

FIG. 10 is a block diagram showing the functional configuration of the information processing apparatus 200. As shown in FIG. 10, the information processing apparatus 200 includes a target-position setting part 211, a position-coordinate acquisition part 212, a direction acquisition part 213, a direction calculation part 214, an imaging part 215, an AR (Augmented Reality) processing part 216, a display part 217, a display processing part 218, and a UI-processing part 219 as the functional configuration.

Figure 11:
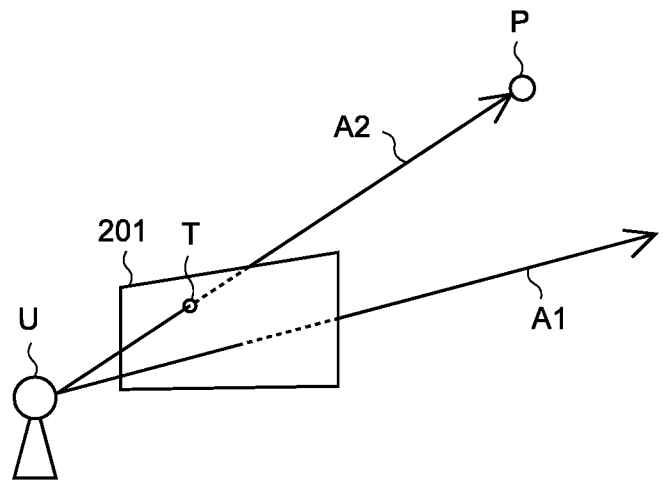
FIG. 11 A diagram schematically showing an operation mode of the information processing apparatus.

FIG. 11 is a diagram schematically illustrating the functional configuration of the information processing apparatus 200. In FIG. 11, a target P and a user U are shown.

The target-position setting part 211 sets a position coordinate of the target P. The target P is a target appointed by the user in real space. Typically, when the user appoints an arbitrary position in a map application displayed on the display 201, a position coordinate in real space corresponding to the position appointed on the map is acquired by the map application.

The position coordinate of the target P may be a two-dimensional coordinate (for example, longitude and latitude), and may also be a three-dimensional coordinate (for example, longitude, latitude, and height).

The position-coordinate acquisition part 212 acquires a position coordinate of the information processing apparatus 200. Specifically, the position-coordinate acquisition part 212 may acquire the position coordinate of the information processing apparatus 200 by using the GPS (Global Positioning System). Moreover, the position-coordinate acquisition part 212 may also acquire the position coordinate of the information processing apparatus 200 by using Wi-Fi or the like. The position-coordinate acquisition part 212 supplies the acquired position coordinate of the information processing apparatus 200 to the direction calculation part 214.

The direction acquisition part 213 acquires a direction (hereinafter, apparatus direction) that the information processing apparatus 200 faces. Typically, the direction that the information processing apparatus 200 faces is a direction orthogonal to the display 201, and is a direction of a visual field of the camera 202. However, this is not particularly limited, and may be a particular direction in which the information processing apparatus 200 is a center. The direction acquisition part 213 may acquire the apparatus direction by using an output from each of a geomagnetic sensor or an acceleration sensor. In FIG. 11, an apparatus direction A1 is shown as the direction that the information processing apparatus 200 faces. The direction acquisition part 113 supplies the apparatus direction A1 to the AR-processing part 216.

The direction calculation part 214 calculates a target direction. The target direction is a direction of the target P with respect to the information processing apparatus 200. The direction calculation part 214 may calculate the target direction A2 from the position coordinate of the information processing apparatus 200 supplied from the position-coordinate acquisition part 212 and the position coordinate of the target P supplied from the target-position setting part 211. In FIG. 11, the target direction A2 is shown. The direction calculation part 214 supplies the target direction A2 to the AR-processing part 216.

Figure 12:
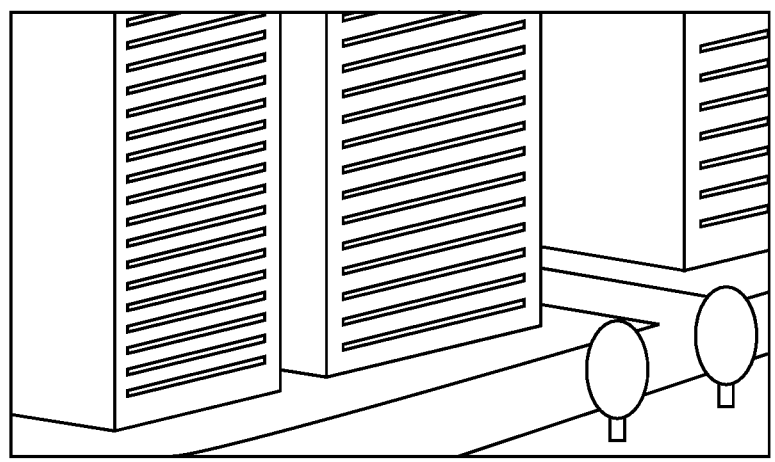
FIG. 12 An example of a camera-through image imaged by the information processing apparatus.

The imaging part 215 generates a camera-through image from an output from the camera 202, and supplies the camera-through image to the AR-processing part 216. FIG. 12 is an example of the camera-through image. Moreover, the imaging part 215 supplies an angle of view (zoom ratio) of the camera 202 to the AR-processing part 216.

The AR-processing part 216 superimposes an object on the camera-through image. Specifically, the AR-processing part 216 calculates which position the target P corresponds to in the camera-through image from the apparatus direction A1, the target direction A2, and the zoom ratio. In FIG. 11, the target position T in the camera-through image is shown. The AR-processing part 216 superimposes the object S on the target position T.

Figure 13:
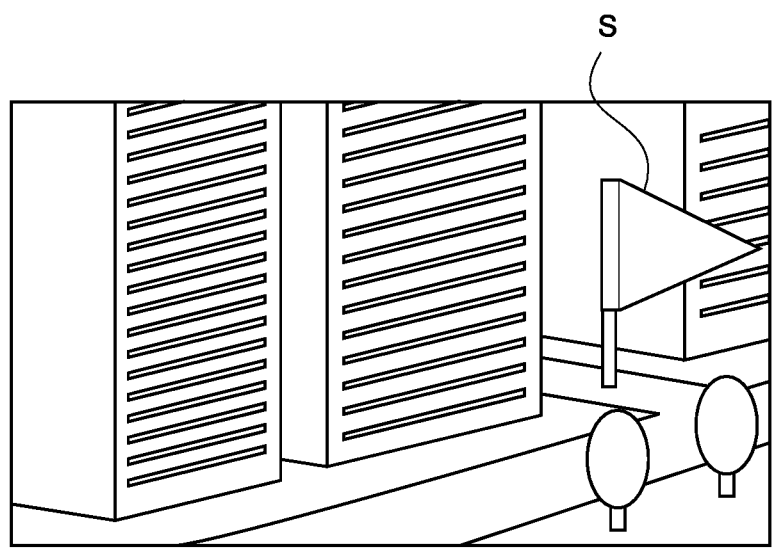
FIG. 13 An example of a camera-through image on which an object is superimposed by the information processing apparatus.

FIG. 13 is an example of the camera-through image on which the object S is superimposed. As shown in FIG. 13, the AR-processing part 216 superimposes the object S on the camera-through image in which a real scene is imaged. A shape of the object S is not particularly limited, and may be a flag shape, for example.

The display part 217 controls the display 201 to display the image on the basis of image information supplied from the display processing part 218. The display processing part 218 performs processing in the camera-through image on which the object S is superimposed by the AR-processing part 216 for displaying the camera-through image. The UI-processing part 219 performs processing according to a UI (User Interface) in the camera-through image on which the object S is superimposed or the like.

[Operation of Information Processing Apparatus]

Figure 14:
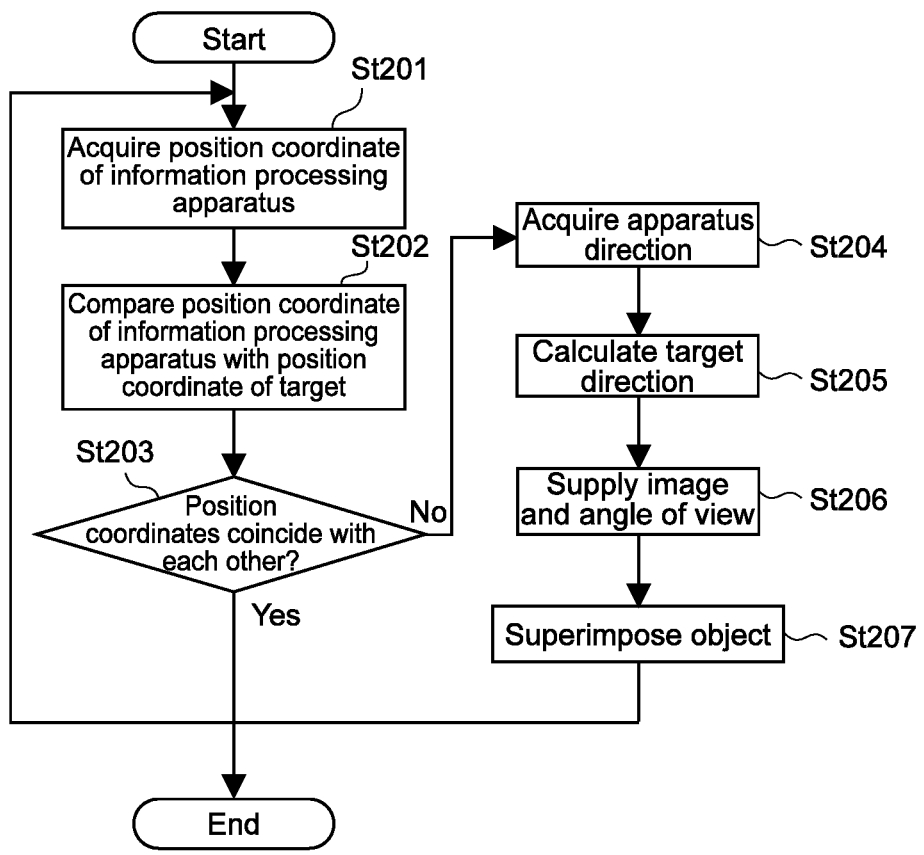
FIG. 14 A flowchart showing an operation of the information processing apparatus.

An operation of the information processing apparatus 200 will be described. FIG. 14 is a flowchart showing the operation of the information processing apparatus 200. Note that the position coordinate of the target P is preset by the target-position setting part 211.

First, the position-coordinate acquisition part 212 acquires the position coordinate of the information processing apparatus 200 (St201), and the AR-processing part 216 compares the position coordinate of the information processing apparatus 200 with the position coordinate of the target P (St202).

In a case that the position coordinate of the information processing apparatus 200 and the position coordinate of the target P coincide with each other (St203: Yes), the information processing apparatus 200 ends the operation. In a case that the position coordinate of the information processing apparatus 200 and the position coordinate of the target P do not coincide with each other (St203: No), the direction acquisition part 213 acquires the apparatus direction A1 (St204).

Next, the direction calculation part 214 calculates the target direction A2 (St205), and supplies the target direction A2 to the AR-processing part 216. The imaging part 215 supplies the camera-through image and an angle of view thereof to the AR-processing part 216 (St206).

The AR-processing part 216 calculates the target position T that is the position of the target P in the camera-through image from the apparatus direction A1, the target direction A2, and the angle of view, and superimposes the object S on the target position T (St207).

The information processing apparatus 200 executes the operation until the position coordinate of the information processing apparatus 200 and the position coordinate of the target P coincide with each other (St203: Yes).

Seen by the user, when the user turns the information processing apparatus 200 to a predetermined direction after appointing the target P, the object S is superimposed on the target position T in the camera-through image. The user may grasp the target P intuitively with reference to the object S in the camera-through image.

In a general AR (Augmented Reality) technology, an object is superimposed by using a feature point that may be acquired from an image imaged by a camera. On the other hand, in the present embodiment, the object is superimposed on the basis of position information and the apparatus direction of the information processing apparatus 200. Thus, the object may also be superimposed on a far target position that the camera may not capture.

[Display Mode of Object]

As described above, the AR-processing part 216 displays the object S on the target position T in the camera-through image. However, a display mode of the object S may be changed.

For example, the AR-processing part 216 may acquire weather information near the target P, and may change the object S according to the weather information. Specifically, the AR-processing part 216 may change how the object having the flag shape streams according to the weather near the target P (wind speed or the like).

Moreover, the AR-processing part 216 may change a size of the object S according to a distance between the information processing apparatus 200 and the target P. Specifically, the AR-processing part 216 may make the object S smaller as the distance between the information processing apparatus 200 and the target P is longer, and may make the object S larger as the distance between the information processing apparatus 200 and the target P is smaller.

In addition, the AR-processing part 216 may stop displaying the object S when the distance between the information processing apparatus 200 and the target P is a predetermined value or less, or when the AR-processing part 216 receives an operation input by the user. Furthermore, the AR-processing part 216 may stop displaying the object S when the distance between the information processing apparatus 200 and the target P is the predetermined value or more. This is effective in a case that the plurality of the targets P exist.

[Method of Using Object]

As described above, the target P may be appointed by the user of the information processing apparatus 200. Moreover, the target-position setting part 211 may also acquire a target position appointed by another user via the Internet or the like and set the target position as the target P. Due to this, a plurality of users may share the same target position. At this time, a string or the like indicating a name of the user appointing the target P may be displayed with the object.

The target P is not limited to a store or a facility, and an arbitrary target may be set as the target P. For example, in a case that an automobile is set as the target P after parking the automobile, this is convenient for searching for the parked automobile. Moreover, the target P may be fixed on a particular position, and with movement of the information processing apparatus 200, the target-position setting part 211 may also update the target P in real time.

Note that the target P is not limited to the target directly appointed by the user. For example, the target-position setting part 211 may set a recommended spot specified from an interest, a taste, or the like of the user as the target P. Moreover, the target-position setting part 211 may set a new target P on a route between the information processing apparatus 200 and the target P. At this time, the target-position setting part 211 may not set the new target P on a straight route between the information processing apparatus 200, but may set the new target P on a route that is selected by expecting route information thereof such as the weather or congestion.

Furthermore, the target-position setting part 211 may appoint the target P for calling for rescue, and a person who wants the other one to get in the ones own automobile by car-allocation service may also appoint the target P. In addition, the target-position setting part 211 may appoint a document or the like as the target P, and may present work or the like that has to be done today by the object S.

Moreover, in the present embodiment, the object S is superimposed on the camera-through image, and the target P is presented. However, the object S may not necessarily be superimposed on the camera-through image, and the AR-processing part 216 may make only the object S be displayed on the display. Furthermore, the information processing apparatus 200 may present the target P by sound or a haptic feedback having directivity instead of the object S.

[Hardware Configuration]

The information processing apparatus 200 may be realized by the similar hardware configuration to the hardware configuration of the information processing apparatus 100 according to the first embodiment.

The hardware configuration of the information processing apparatus 200 is not particularly limited, and may be a configuration in which the functional configuration described above may be realized. Moreover, a part or all of the hardware configuration may exist in the network.

[Information Processing System]

The functional configuration of the information processing apparatus 200 described above may be realized by an information processing system including a plurality of information processing apparatuses that are connected to each other. For example, the functional configuration of the information processing apparatus 200 described above may be realized by the information processing system including an information processing apparatus that includes the position-coordinate acquisition part 212, the direction acquisition part 213, and the direction calculation part 214, an information processing apparatus that includes the imaging part 215, the display part 217, and the display processing part 218, and an information processing apparatus that includes the AR-processing part 216.

Note that the present technology may also employ the following configurations.

(1)

An information processing apparatus, including: a position-coordinate acquisition part acquiring a position coordinate of the information processing apparatus;

a direction acquisition part acquiring an apparatus direction that the information processing apparatus faces;

a direction calculation part calculating a target direction being a direction of a target with respect to the information processing apparatus from a position coordinate of the target and the position coordinate of the information processing apparatus; and a haptic-feedback determining part determining a haptic feedback to be presented to a user on the basis of an angle formed by the apparatus direction and the target direction.

(2)

The information processing apparatus according to (1), in which the haptic-feedback determining part determines a first haptic feedback as the haptic feedback to be presented to the user in a case that the formed angle is a predetermined value or more, and determines a second haptic feedback being different from the first haptic feedback as the haptic feedback to be presented to the user in a case that the formed angle is less than the predetermined value.

(3)

The information processing apparatus according to (2), in which the haptic-feedback determining part determines an intensity of the first haptic feedback according to a size of the formed angle in the case that the formed angle is the predetermined value or more.

(4)

The information processing apparatus according to (2) or (3), in which the haptic-feedback determining part determines an intensity of the second haptic feedback according to a distance between the information processing apparatus and the target in the case that the formed angle is less than the predetermined value.

(5)

The information processing apparatus according to any one of (1) to (4), further including a haptic-feedback presenting part presenting the haptic feedback to the user, in which the haptic-feedback presenting part produces an oscillation that causes the user to feel that the information processing apparatus is pulled in a predetermined direction.

(6)

The information processing apparatus according to any one of (1) to (5), further including a target-position setting part setting the position coordinate of the information processing apparatus as the position coordinate of the target according to a predetermined operation input to the information processing apparatus.

(7)

An information processing system, including:

a position-coordinate acquisition part acquiring a position coordinate of an information processing apparatus;

a direction acquisition part acquiring an apparatus direction that the information processing apparatus faces;

a direction calculation part calculating a target direction being a direction of a target with respect to the information processing apparatus from a position coordinate of the target and the position coordinate of the information processing apparatus; and a haptic-feedback determining part determining a haptic feedback to be presented to a user on the basis of an angle formed by the apparatus direction and the target direction.

(8)

An information processing method, in which a position-coordinate acquisition part acquires a position coordinate of an information processing apparatus, a direction acquisition part acquires an apparatus direction that the information processing apparatus faces, a direction calculation part calculates a target direction being a direction of a target with respect to the information processing apparatus from a position coordinate of the target and the position coordinate of the information processing apparatus, and a haptic-feedback determining part determines a haptic feedback to be presented to a user on the basis of an angle formed by the apparatus direction and the target direction.

REFERENCE SIGNS LIST

100, 200 information processing apparatus
101, 201 display
202 camera
111, 211 target-position setting part
112, 212 position-coordinate acquisition part
113, 213 direction acquisition part
114, 214 direction calculation part
115 haptic-feedback determining part
116 haptic-feedback presenting part
216 AR-processing part It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An information processing apparatus, comprising:
a position-coordinate acquisition part acquiring a position coordinate of the information processing apparatus in real space;
a target-position setting part setting a position coordinate of a target in real space;

a direction acquisition part acquiring an apparatus direction that the information processing apparatus faces;

a direction calculation part calculating a target direction of the target with respect to the information processing apparatus based on the position coordinate of the target and the position coordinate of the information processing apparatus; and a haptic-feedback determining part determining a haptic feedback to be presented to a user on a basis of an angle between the apparatus direction and the target direction.

2. The information processing apparatus according to claim 1, wherein the haptic-feedback determining part determines a first haptic feedback as the haptic feedback to be presented to the user in a case that the angle is a predetermined value or more, and determines a second haptic feedback being different from the first haptic feedback as the haptic feedback to be presented to the user in a case that the angle is less than the predetermined value.

3. The information processing apparatus according to claim 2, wherein the haptic-feedback determining part determines an intensity of the first haptic feedback according to a size of the angle in the case that the angle is the predetermined value or more.

4. The information processing apparatus according to claim 2, wherein the haptic-feedback determining part determines an intensity of the second haptic feedback according to a distance between the information processing apparatus and the target in the case that the angle is less than the predetermined value.

5. The information processing apparatus according to claim 1, further comprising a haptic-feedback presenting part presenting the haptic feedback to the user, wherein the haptic-feedback presenting part produces an oscillation that causes the user to feel that the information processing apparatus is pulled in a predetermined direction.

6. The information processing apparatus according to claim 1, wherein the target-position setting part setting the position coordinate of the information processing apparatus as the position coordinate of the target according to a predetermined operation input to the information processing apparatus.

7. An information processing system, comprising:

a position-coordinate acquisition part acquiring a position coordinate of an information processing apparatus;

a target-position setting part setting a position coordinate of a target in real space;

a direction acquisition part acquiring an apparatus direction that the information processing apparatus faces;

a direction calculation part calculating a target direction of the target with respect to the information processing apparatus based on the position coordinate of the target and the position coordinate of the information processing apparatus; and a haptic-feedback determining part determining a haptic feedback to be presented to a user on a basis of an angle between the apparatus direction and the target direction.

8. An information processing method, wherein a position-coordinate acquisition part acquires a position coordinate of an information processing apparatus in real space, a target-position setting part sets a position coordinate of a target in real space;

a direction acquisition part acquires an apparatus direction that the information processing apparatus faces, a direction calculation part calculates a target direction of the target with respect to the information processing apparatus based on the position coordinate of the target and the position coordinate of the information processing apparatus, and a haptic-feedback determining part determines a haptic feedback to be presented to a user on a basis of an angle between the apparatus direction and the target direction.

9. The information processing apparatus according to claim 2, further comprising a haptic-feedback presenting part, wherein the haptic-feedback presenting part increases an intensity of the first haptic feedback when the angle becomes smaller.

10. The information processing apparatus according to claim 2, further comprising a haptic-feedback presenting part, wherein the haptic-feedback presenting part increases an intensity of the first haptic feedback when a distance between the information processing apparatus and the target becomes smaller.

* * * * *